(12) United States Patent
Budde

(10) Patent No.: US 7,318,686 B2
(45) Date of Patent: Jan. 15, 2008

(54) HIGH-PERFORMANCE BALL SOCKET

(75) Inventor: Frank Budde, Damme (DE)

(73) Assignee: ZF Lemförder Metallwaren AG, Stemwede-Dielingen (DE)

(*) Notice: Subject to any disclaimer, the term of this patent is extended or adjusted under 35 U.S.C. 154(b) by 192 days.

(21) Appl. No.: 10/895,122

(22) Filed: Jul. 20, 2004

(65) Prior Publication Data

US 2004/0258462 A1  Dec. 23, 2004

Related U.S. Application Data

(63) Continuation of application No. PCT/DE03/02387, filed on Jul. 16, 2003.

(30) Foreign Application Priority Data

Jul. 24, 2002 (DE) ............................... 102 33 489

(51) Int. Cl.
*F16C 11/00* (2006.01)

(52) U.S. Cl. .............. 403/141; 403/133; 403/142; 403/143

(58) Field of Classification Search ................ 403/56, 403/76, 90, 114, 115, 122–144; 384/206, 384/208
See application file for complete search history.

(56) References Cited

U.S. PATENT DOCUMENTS 4,076,344 A * 2/1978 Gaines et al. ............... 403/140
4,372,621 A    2/1983 Farrant
4,797,019 A    1/1989 Wood, Jr.
5,427,467 A * 6/1995 Sugiura ...................... 403/140
5,758,986 A    6/1998 Kraps
5,772,337 A * 6/1998 Maughan et al. ........... 403/140
6,109,816 A * 8/2000 Iwasaki ...................... 403/135
6,164,829 A   12/2000 Wenzel et al.
6,171,012 B1   1/2001 Westphal

FOREIGN PATENT DOCUMENTS

| DE | 973633        | 4/1960 |
|----|---------------|--------|
| DE | 1 469 973     | 3/1969 |
| DE | 297 22 507 U1 | 6/1999 |
| DE | 199 32 789 A1 | 1/2001 |
| EP | 0 638 735 A1  | 2/1995 |
| GB | 929886        | 6/1963 |

* cited by examiner

Primary Examiner—Daniel P. Stodola
Assistant Examiner—Victor MacArthur
(74) Attorney, Agent, or Firm—McGlew and Tuttle, P.C.

(57) ABSTRACT

A bearing shell for a ball and socket joint made of plastic as well as the ball and socket joint per se, wherein the bearing shell has first areas, which are subject to higher mechanical loads than the other areas of the bearing shell, wherein the material of the bearing shell forming the first areas is formed from a reinforced plastic, and the other areas are made of a less reinforced or unreinforced plastic.

22 Claims, 6 Drawing Sheets

HIGH-PERFORMANCE BALL SOCKET

CROSS REFERENCE TO RELATED APPLICATION

This is a continuation of and claims the benefit (35 U.S.C. §120 and 365(c)) of copending International Application PCT/DE 2003/002387 of 16 Jul. 2003, which designated inter alia the United States and which claims the priority of German Application DE 102 33 489.7 of 24 Jul. 2002. The entire contents of each application is hereby incorporated by reference in its entirety.

FIELD OF THE INVENTION

The present invention pertains to a bearing shell made of plastic for a ball and socket joint, especially for motor vehicles as well as to the ball and socket joint per se.

BACKGROUND OF THE INVENTION

A bearing shell of this class for ball and socket joints, especially for motor vehicles, is known from DE 29722507 U1. DE 29722507 U1 discloses a bearing shell, which has slots for elastic deflection during the mounting of a joint ball in the bearing shell, the slots extend essentially in the direction of the central axis of the bearing shell. The inner walls of the bearing shell have groove-like depressions, which are used as grease depots for lubricating the ball and socket joint. Spacer nubs are provided on the outer walls of the bearing shell, which preset the position of the bearing shell in the ball and socket joint housing. The spacer nubs generate a pretension, however slight, after insertion into the ball and socket joint housing due to the additional material, which presses the bearing shell against the joint ball due to being supported on the ball and socket joint housing. Pretensioning of the bearing shell in certain areas is definitely desirable, because this makes it possible for the joint ball not to be lifted off from parts of the bearing shell even under load, so that the entire contact surface is available for the transmission of torques in the joint. However, the pretension brought about by the spacer nubs on the outer sides of the bearing shell acts on the entire bearing shell or the mounted joint ball and consequently also in areas in which such a pretension counteracts the actual task of the ball and socket joint, or leads to increased wear in certain areas, and thus shortens the service life of the ball and socket joint. At the same time, the space needed for installation is increased.

DE 19932789 A1 discloses a ball and socket joint in which the joint ball is enclosed in a manner adapted to the direction of the load to increase the transmission of forces without requiring a larger space for installation. The areas of the joint ball that are loaded more heavily due to the direction of the force, surround the bearing shell more than the less heavily loaded areas. However, the bearing shell must be lengthened in this embodiment to mount the joint ball in the bearing shell, which is equivalent to a great mounting effort as well as a high load on the material, which may lead to rupture of the bearing shell.

The bearing shells according to DE 19932789 A1 as well as DE 29722507 U1 are made homogeneously from a plastic by injection molding. This design leads in practice to the problem that if an inexpensive plastic is used, it is tribologically well suited in the unreinforced form but does not have sufficient strength, or it has good strength properties due to fiber reinforcement. Good strength properties are, however, equivalent to a loss of the tribological properties in case of inexpensive plastics. Pretensioning of the bearing shell to achieve better transmission of forces also cannot be achieved with these plastics because of the lack of flexibility.

SUMMARY OF THE INVENTION

The object of the present invention is therefore to provide a bearing shell and a ball and socket joint having a bearing shell that have an increased service life due to their design.

This object is accomplished according to the present invention with a bearing shell having first areas, which are subject to higher mechanical loads than the other areas of the bearing shell, wherein the material of the bearing shell forming the first areas is made of a reinforced plastic, and the other areas are made of a less reinforced or unreinforced plastic.

Depending on the field of use of the ball bearing, the ball bearing according to the present invention and consequently also the bearing shell according to the present invention can be loaded more strongly either radially or also axially. Under a radial or axial load, the area of the bearing shell in which the joint ball is in contact because of the load (loading area) is compressed by the joint ball in the direction of the load.

If the bearing shell yields, the joint ball likewise moves in the loading direction by the amount by which the bearing shell yields. As a result, the joint ball can lift off from the area located opposite the loaded area of the bearing shell (opposite means here in a direction opposite the direction of load). The areas of the bearing shell that are loaded less heavily are therefore made according to the present invention from an unreinforced or less reinforced plastic. Due to the resulting increase in the flexibility of the plastic, the bearing shell is pretensioned during the mounting, as a result of which the joint ball cannot lift off from the bearing shell any longer, so that all contact surfaces of the bearing shell are in contact for transmitting forces even under a heavy load. At the same time, the risk of free clearance of the joint ball in the bearing shell, which may lead to deflection and consequently to failure of the joint, is reduced at the same time due to the pretensioning of the bearing shell, which is thus achieved. Areas that are exposed to higher loads have according to the present invention a reinforced core, which counteracts the deformation and wear occurring under load and thus reduces the amount by which the joint ball sinks under heavy load due to the compression of the plastic. A bearing shell thus designed makes it advantageously possible to design the bearing shell with a large contact surface in one piece and at the same time to make it from a highly fiber-reinforced material.

Another advantageous embodiment is obtained by means of a bearing shell that is additionally provided with webs and slots. Due to the advantageous arrangement of webs and slots on the bearing shell, the tolerance compensation achieved by the pretension can be additionally supported by the pretension being able to be coordinated even more accurately with the type of the stress. In addition, webs and slots make possible simple mounting without great stress of the reinforced, and consequently less expandable areas, due to a defined elastic expansion of the bearing shell. The risk of rupture of the bearing shell due to excessive expansion of the unelastic areas is thus advantageously reduced.

The bearing shell according to the present invention advantageously has reinforced, and unreinforced or less reinforced areas. The reinforced areas being manufactured, e.g., by means of a multicomponent system. The multicomponent system is composed of reinforced plastics, and less reinforced and/or unreinforced plastics. The reinforced area comprises a core component and a jacket component. Due to corresponding additives, e.g., fibers, mica, minerals, fillers or beads, the core component forms the reinforcement, whose degree of reinforcement can be set variably by varying the type and the amount of the reinforcing additives used. The jacket component is formed by a tribologically suitable plastic. It surrounds the core component in the sections in which there may be increased risk for wear due to friction effects because of corresponding reinforcing additives, e.g., between the core component and the joint ball, and the susceptibility to wear of the ball and socket joint thus decreases. The material costs can be lowered due to the use of the above-described plastics and the bearing shell can thus be manufactured at a lower cost.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
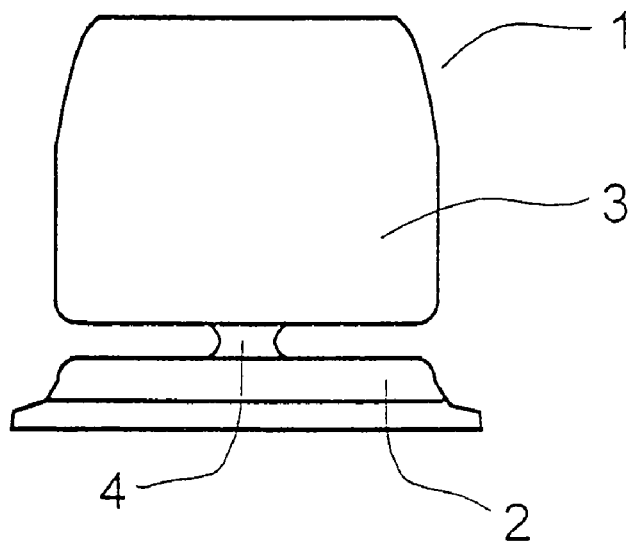
FIGS. 1 and 2 are side views of a one-part bearing shell of a ball and socket joint loaded mainly radially with axial and radial tolerance compensation.
Figure 2:
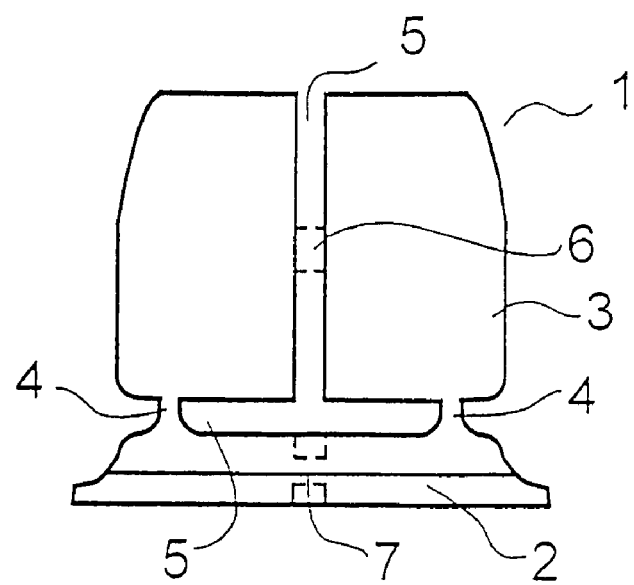
Figure 3:
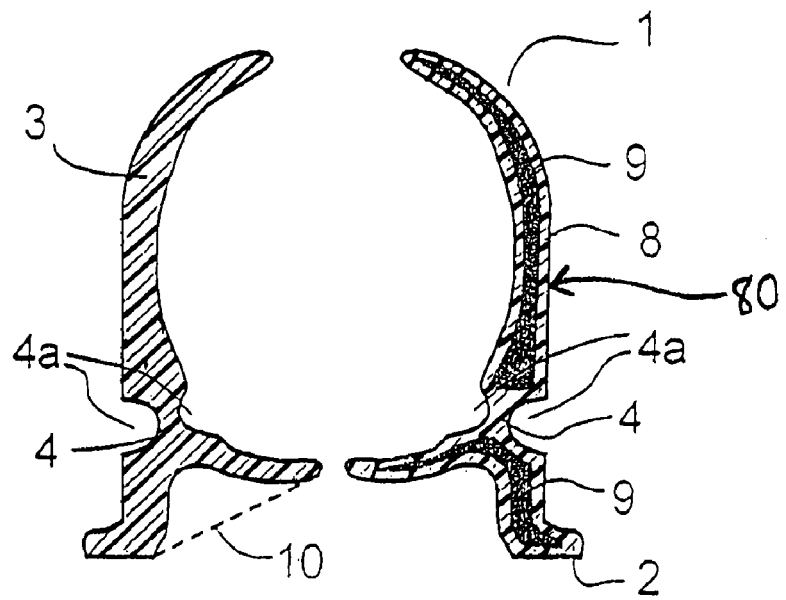
FIG. 3 is a cross section through the bearing shell according to FIGS. 1 and 2.

Referring to the drawings, FIGS. 1 through 3 show a bearing shell 1 of a ball and socket joint loaded mainly radially. The bearing shell has a one-part design and has a basic body 2, with which a bearing shell part 3 comprising a joint ball receiving part is made integrally in one piece. To simplify the mounting, the bearing shell 1 is provided with elastic webs 4 and slots 5, which enable the bearing shell 1 to expand elastically during the mounting operation. Weakening of the plastic, which is otherwise common, and which may lead to rupture of the bearing shell due to the strain of the plastic during the mounting operation, is counteracted by the elastic expansion already during the mounting operation.

The bearing shell according to FIG. 1 is intended mainly for radially loaded ball and socket joints. The elastic web 4 is designed such that, combined with a circular slot 5, the bearing shell can expand elastically without the application of any great force during the mounting (see FIG. 3). The webs 4 later act as a tolerance compensation during the mounting due to their elastic behavior, and they compensate the tolerances of the housing and the ball. An increase in the axial tolerance compensation can be achieved by means of a rubber ring, which is installed during the mounting of the bearing shell in the ball and socket joint housing between the bearing shell and the ball and socket joint housing. Differences in height that may possibly occur can thus be compensated during the mounting, as a result of which more uniform joints can be manufactured.

FIG. 2 shows another side view of the bearing shell 1 of the ball and socket joint loaded mainly radially. The bearing shell has a circular slot 5 along the bearing shell part 3. To increase the stability of the bearing shell before installation in a bearing shell housing, another web 6 (indicated by broken line), which connects the bearing shell parts with one another, may be arranged on one side. Webs 7, likewise indicated by broken line, may be optionally arranged in the basic body 2 of the bearing shell 1 in order to achieve a radial tolerance compensation by a corresponding pretension.

FIG. 3 shows a cross section of the bearing shell 1 according to FIG. 1. Corresponding to the type of load, the bearing shell 1 may be reinforced on both sides, less reinforced or unreinforced on both sides as well as reinforced on one side and at the same time less reinforced or unreinforced on the other side. Both the basic body 2 and the bearing shell parts 3 have a two-component system, which comprises a tribologically suitable jacket component 80 having a jacket surface 8, into which a core 9 reinforcing the plastic is inserted, on the right-hand side in the exemplary embodiment according to FIG. 3. The core 9 is reinforced with fibers 72, mica 74, minerals 76, fillers or beads 78. The core 9 counteracts the deformation and wear occurring at an area 70 that is subject to higher mechanical loads. To manufacture this system, a first plastic is first injected into the correspondingly shaped cavity, the cavity being filled only partly. This material forms the jacket surface of the two-component system. The cavity is filled completely in a second process step with a second plastic, which forms the reinforced core component. Depending on the prevailing type of load, the basic body 2 of the bearing shell 1 may also be made unreinforced or slightly reinforced by a corresponding gating technique in order to thus achieve, for example, a higher pretension on the joint ball and to increase the axial pretension as a result. The bearing shell 1 is reinforced less or is unreinforced on the left-hand side to increase the pretension. To increase the stability of the basic body, ribs 10 may optionally be made in one piece with the basic body. Furthermore, the bearing shell has openings 4a on its inner side and/or outer side, which facilitate especially the elastic expansion of the bearing shell during the mounting.

Figure 4:
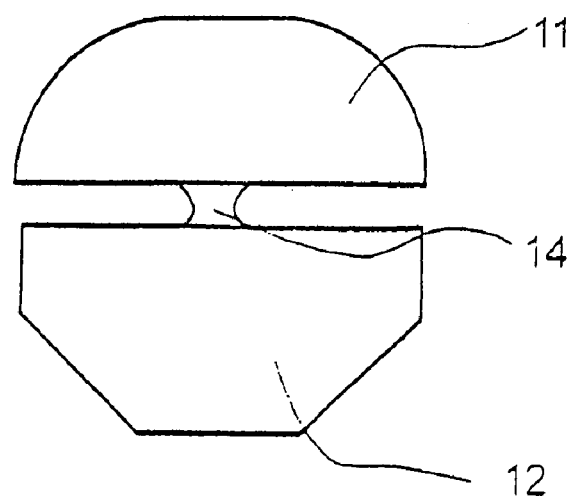
FIGS. 4 and 5 are side views of a one-part bearing shell of a ball and socket joint loaded mainly axially with axial and radial tolerance compensation.
Figure 5:
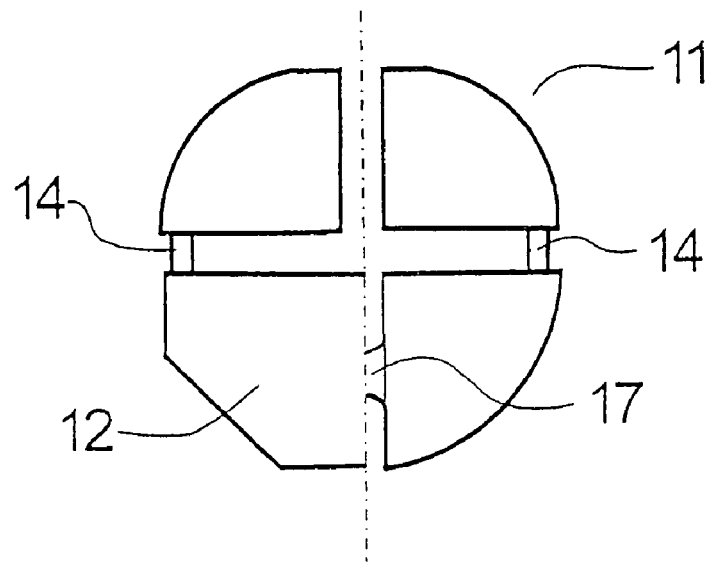

FIGS. 4 and 5 show exemplary embodiments of a bearing shell 11 of a ball and socket joint loaded mainly axially. The bearing shell 11 may be reinforced on both sides, less reinforced or unreinforced on both sides and reinforced on one side and at the same time less reinforced or unreinforced on the other side in this embodiment as well corresponding to the type of load. The corresponding webs 14 are arranged in the areas in which the lowest loads must be absorbed; this area is at the level of the equatorial plane in the exemplary embodiment (FIG. 4). The web 14 is used to facilitate the mounting as well as to generate a pretension of the bearing shell in this exemplary embodiment as well. To increase the radial tolerance compensation, an additional web 17 may be additionally provided at the basic body 12 (FIG. 5). The outer contour of the basic body 12 may be either circular (FIG. 5, right) or oblique (FIG. 5, left) corresponding to the design specifications.

Figure 6:
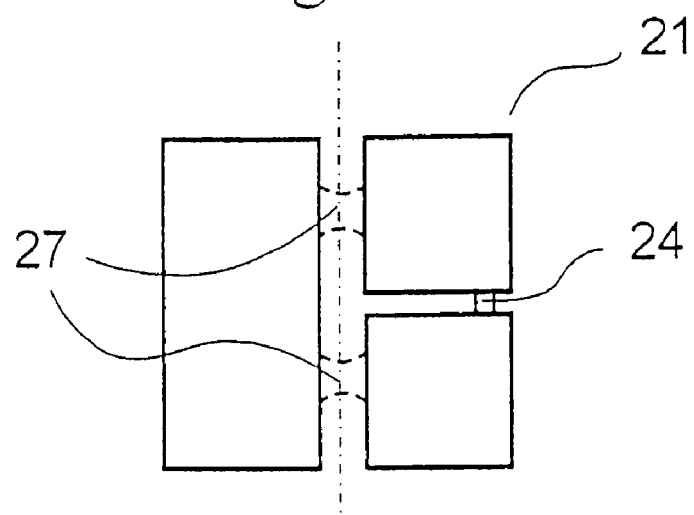
FIG. 6 is a side view of a one-part bearing shell of a ball and socket joint loaded mainly axially in the form of a sleeve joint with axial and radial tolerance compensation.
Figure 7:
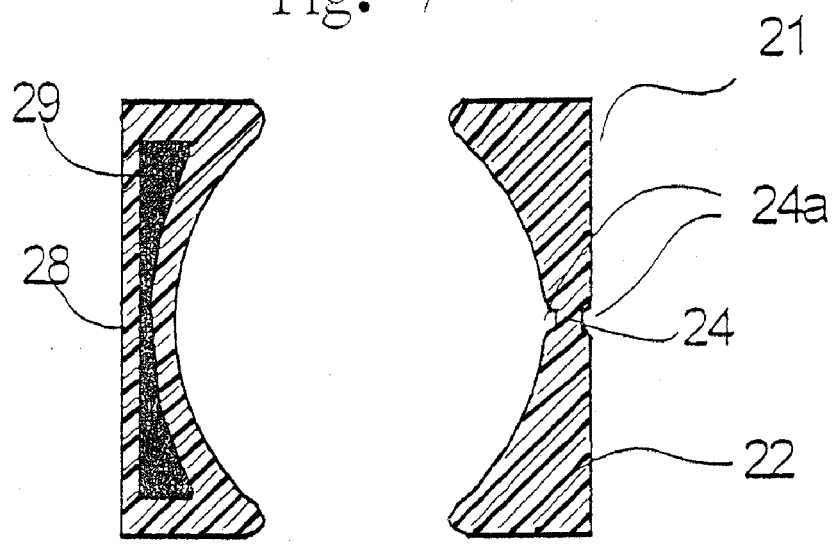
FIG. 7 is the cross section of the bearing shell according to FIG. 6.

FIGS. 6 and 7 show a one-part bearing shell 21 of a ball and socket joint loaded mainly axially in the form of a sleeve joint. Both elastic webs (24, 27) and reinforcements of the plastic are arranged corresponding to the load. For example, the right-hand part of the bearing shell is made with an elastic web for axial tolerance compensation in FIG. 6, whereas the left-hand part of the bearing shell is massive. Elastic webs 27 (indicated by broken lines in FIG. 6) may optionally also be arranged for radial pretensioning. Additional longitudinal slots may be prepared in the bearing shell 21 for simple mounting. FIG. 7 shows a section through the bearing shell according to FIG. 6. The bearing shell has a two-component system 28, 29 (FIG. 7, left) on one side, and it is less reinforced or unreinforced on the other side (FIG. 7, right).

Figure 8:
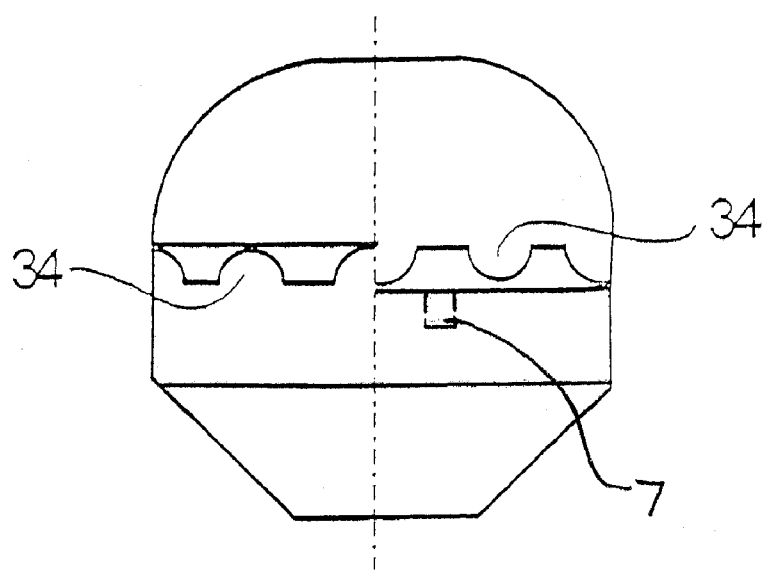
FIG. 8 is the side view of a multipart bearing shell with axial and radial tolerance compensation.

FIG. 8 shows a side view of a multipart bearing shell with axial and radial tolerance compensation. The axial tolerance compensation is achieved by integral material additions 34 in the form of projections, which are arranged such that they are compressed during the mounting of the bearing shell in the ball and socket joint housing and expand again in the areas in which the joint ball sinks corresponding to the load, and the clearance thus generated is again compensated. The integral material additions 34 are arranged, for example, on the lower shell (FIG. 8, left), on the one hand, and on the upper shell (FIG. 8, right), on the other hand. The radial tolerance compensation as well as the pretensioning of the bearing shell after the mounting are made possible by the corresponding arrangement of webs (cf. FIG. 2).

Figure 9:
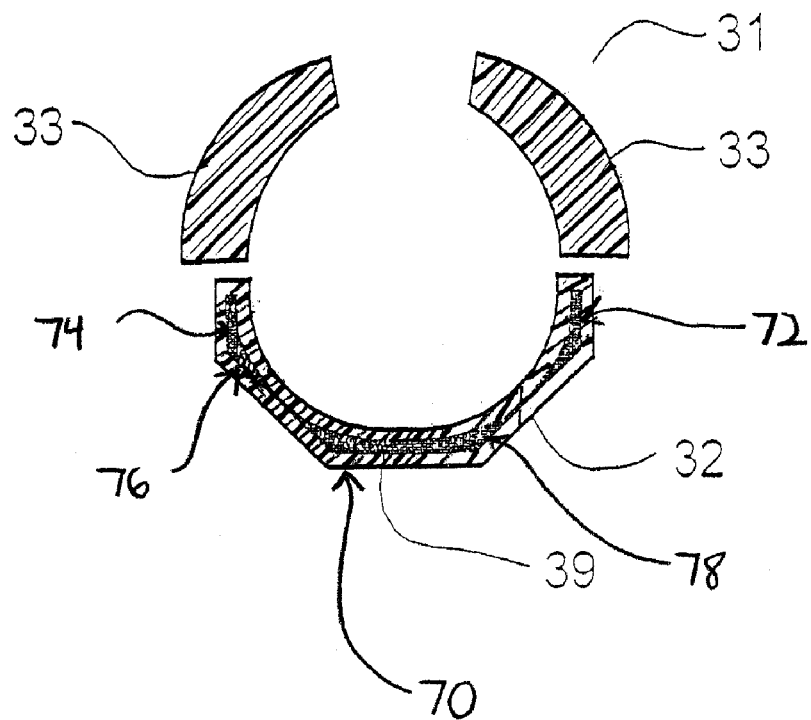
FIG. 9 is the cross section of a multipart bearing shell of a ball and socket joint loaded mainly axially in the form of a support joint with axial and radial tolerance compensation.

FIG. 9 shows a cross section of a multipart bearing shell 31 of a ball and socket joint loaded mainly axially in the form of a support joint. Since compressive forces prevail in this embodiment, the plastic of the bearing shell sinks in the area of the contact surfaces of the joint ball on the basic body 32. A great tolerance compensation, which is correspondingly necessary, is achieved by a greater pretension of the bearing shell 31 due to the use of bearing shell parts 33 with greater wall thicknesses. The increase in the wall thickness of the bearing shell parts 33 arranged opposite the direction of the force causes an increase in the pretension in the bearing shell 31, which is equivalent to stronger compression of the plastic during mounting. If the plastic is compressed in the area of the contact surfaces of the basic body 32 during the loading of the support joint, the clearance generated in the process between the joint ball and the bearing shell parts 33 is compensated by the relief of the elastic plastic of the bearing shell parts 33, which is pressed by the pretension. To counteract the sinking, the basic body 32 of the bearing shell 31 may have a reinforcing core 39.

Figure 10:
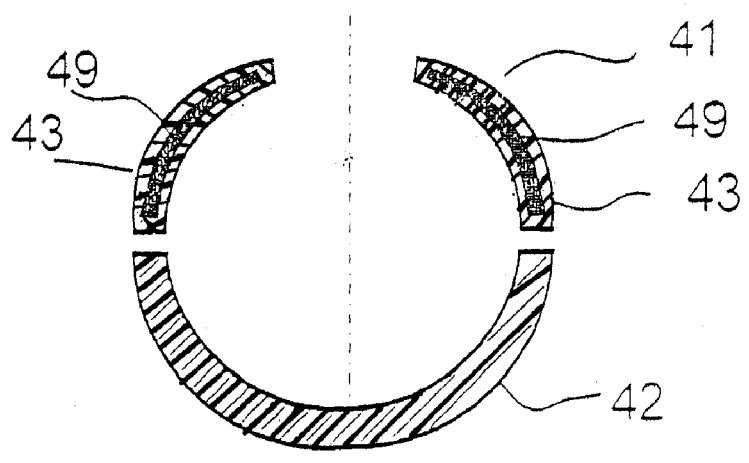
FIG. 10 is the cross section of a multipart bearing shell of a ball and socket joint loaded mainly under tension in the form of an axial joint.

FIG. 10 shows a cross section through a multipart bearing shell 41 of a ball and socket joint loaded mainly under tension in the form of an axial joint. Corresponding to the load, mainly the area of the bearing shell parts 43 above the equatorial plane is provided with a reinforcing core 49 here. Depending on the value of the load, the basic body 42 may have a greater wall thickness than the bearing shell parts in this case as well; this is not shown in FIG. 10.

Figure 11:
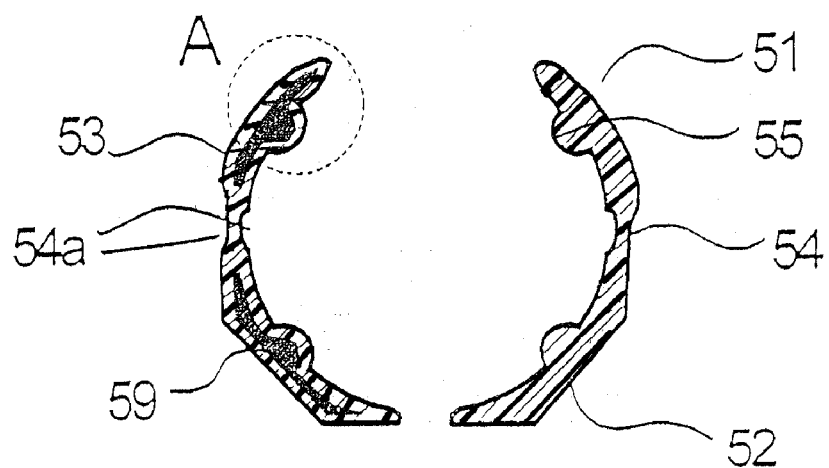
FIG. 11 is the cross section of a one-part bearing shell with defined support area.
Figure 12:
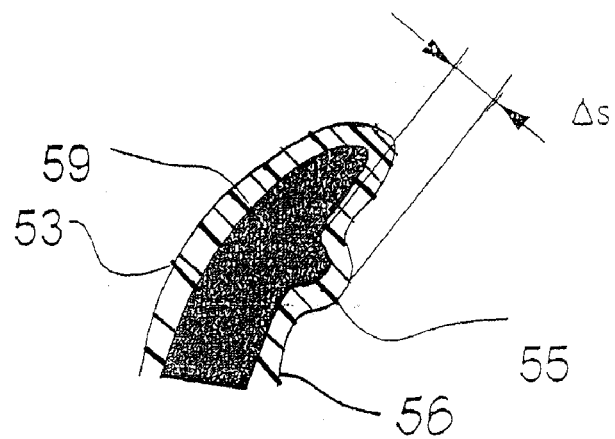
FIG. 12 is an enlarged view of a projection necessary for varying the support areas on the inner side of the bearing shell according to detail A.

FIG. 11 shows a cross section of a bearing shell 51, which is reinforced with a core 59, is provided with elastic webs 54 and which makes possible, in addition to the above-mentioned features, to adapt the engaging support surface to the value of the load and thus to obtain defined torques in the ball and socket joint by the arrangement of projections 55 (cf. FIG. 12) on the inner surfaces of the bearing shell. Both the basic body 52 and the bearing shell parts 53 have, for example, a reinforcing core 59. The contact surface of the joint ball with the bearing shell is formed alone by the projections 55 having the height As under low loads. The joint ball displaces the plastic forming the projections with increasing load, so that the entire inner surface 56 of the bearing shell 51 forms the contact surface of the joint ball and the entire surface of the ball socket is involved as a result in the transmission of the forces. The forces are transmitted uniformly to the plastic, and the effective contact pressures are kept low, so that the plastic is loaded less and its creep is reduced.

While a specific embodiment of the invention has been shown and described in detail to illustrate the application of the principles of the invention, it will be understood that the invention may be embodied otherwise without departing from such principles.

What is claimed is:

1. A bearing shell for a ball and socket joint, the bearing shell comprising:
   a cup-shaped upper part adapted to receive a first half of a joint ball of the ball and socket joint, said upper part having a hole adapted to receive a ball pin of the ball and socket joint;
   a cup shaped lower part adapted to receive a second half of the joint ball, said lower part having a cup shaped reinforcing core and a cup shaped jacket component completely jacketing the entire outer surface of said core, said core being composed of a first plastic material uniformly reinforce with one of fibers, mica, minerals or beads, said jacket component being composed of a second plastic material either unreinforced or reinforced with one of fibers, mica, minerals or beads, said first material being more reinforced than said second material; and
   a first plurality of projections disposed on said upper part interlocking with a second plurality of projections disposed on the lower part to prevent relative rotation between the upper and lower parts.

2. A bearing shell in accordance with claim 1, wherein:
   said lower part is arranged in an area of the ball and socket joint which is subject to higher mechanical loads than said upper part of the bearing shell, said upper part being made of an unreinforced plastic.

3. A bearing shell in accordance with claim 2, wherein:
   said upper part of the bearing shell has a greater wall thickness than said lower part especially for tolerance compensation.

4. A bearing shell in accordance with claim 1, wherein:
   said bearing shell has a multi-part design.

5. A bearing shell in accordance with claim 1, wherein:
   one of said upper part and lower part of the bearing shell is a basic body, which is used especially for the defined installation of the bearing shell in a ball and socket joint housing.

6. A bearing shell in accordance with claim 5, wherein:
   said basic body has contact surfaces for supporting the joint ball.

7. A bearing shell in accordance with claim 5, wherein:
   said basic body of the bearing shell has reinforcing ribs.

8. A bearing shell in accordance with claim 1, wherein:
one part of the bearing shell is a basic body and has a reinforcing core in areas in which higher loads occur and is reinforced less or is unreinforced in other areas.

9. A bearing shell in accordance with claim 8, wherein: another part of the bearing shell is a bearing shell part and is shaped to surround a joint ball, said bearing shell part is fastened to said basic body.

10. A bearing shell in accordance with claim 1, wherein: the bearing shell has a shape defining one of a slot and a web, said web including an elastic plastic, said web and said slot making possible one of axial and radial elastic expansion of the bearing shell during mounting as well pretensioning and/or tolerance compensation of said bearing shell.

11. A bearing shell in accordance with claim 1, wherein: a shape of the bearing shell has projections, which form a contact surface of a ball and socket joint under low load of the ball and socket joint.

12. A bearing shell in accordance with claim 11, wherein: one part of the bearing shell is a basic body;
another part of the bearing shell is a bearing shell part and is shaped to surround a joint ball, said bearing shell part is fastened to said basic body;
said projections are located on an inner side of the bearing shell and are displaced from the joint ball under increasing load, so that an entire inner surface of said bearing shell part surrounding the joint ball and a supporting part of said basic body form a contact surface of a ball and socket joint.

13. A bearing shell in accordance with claim 1, wherein: said jacket component comprises one or more of PTFE, a plastic containing graphite or plastic containing aramid fibers.

14. A bearing shell in accordance with claim 1, wherein: said bearing shell comprises multiple parts;
said upper part forms one separate part of said bearing shell; and
said lower part forms another separate part of said bearing shell.

15. A bearing shell in accordance with claim 1, wherein: said bearing shell comprises multiple parts including a shell part corresponding to said upper part and a separate basic body corresponding to said lower part.

16. A bearing shell in accordance with claim 1, wherein: said bearing shell comprises webs to achieve a radial tolerance compensation.

17. A bearing shell in accordance with claim 1, wherein: said upper part and said lower part are arranged on opposite sides of the bearing shell.

18. A bearing shell for a ball and socket joint, the bearing shell comprising:
a first cup-shaped part adapted to receive a first half of a joint ball of the ball and socket joint, said first part having a hole adapted to receive a ball pin of the ball and socket joint;
a cup-shaped second part adapted to receive a second half of the joint ball, said second part having a cup-shaped reinforcing core and a cup-shaped jacket component completely jacketing the entire outer surface of said core, said core being made of a first plastic material uniformly reinforced with one of fibers, mica, minerals or beads, said jacket component being composed of a second plastic material either unreinforced or reinforced with one of fibers, mica, minerals or beads, said first material being more reinforced than said second material.

19. A bearing shell in accordance with claim 18, wherein said jacket component forms the outer surface of said second part.

20. A bearing shell in accordance with claim 18, wherein said first part and said second part are axially spaced from one another.

21. A bearing shell in accordance with claim 18, wherein said first part has a lower end area, said second part having an upper end area, said lower end area being arranged opposite said lower end area, said lower end area having a greater wall thickness than said upper end area.

22. A bearing shell in accordance with claim 18, wherein said first part has a wall thickness that decreases with increasing distance to said second part.

* * * * *